United States Patent [19]

Vincent

[11] 4,387,129

[45] Jun. 7, 1983

[54] LAMINATES HAVING OPTICALLY CLEAR LAMINATES HAVING HIGH MOLECULAR WEIGHT PHENOXY-HIGH CRYSTALLINITY POLYURETHANE ADHESIVE

[75] Inventor: Kent D. Vincent, Cupertino, Calif.

[73] Assignee: Hewlett-Packard Company, Palo Alto, Calif.

[21] Appl. No.: 345,262

[22] Filed: Feb. 2, 1982

Related U.S. Application Data

[60] Continuation of Ser. No. 151,215, May 19, 1980, abandoned, which is a division of Ser. No. 61,581, Jul. 30, 1979, abandoned.

[51] Int. Cl.³ .................. B32B 3/10; B32B 27/08; B32B 27/28
[52] U.S. Cl. ............................ 428/195; 428/200; 428/205; 428/206; 428/207; 428/343; 428/349; 428/354; 428/355; 428/412; 428/423.1; 428/423.7; 428/480

[58] Field of Search ............... 428/423.1, 343, 355, 428/412, 195, 423.7, 480, 200, 205, 206, 207, 354, 349; 525/454, 930

[56] References Cited

U.S. PATENT DOCUMENTS 3,320,090  5/1967  Graubart ................. 525/930 X
3,440,086  4/1969  Kerns .................... 525/930

FOREIGN PATENT DOCUMENTS 2443252  3/1975  Fed. Rep. of Germany ...... 525/930

Primary Examiner—Thomas J. Herbert, Jr.
Attorney, Agent, or Firm—Edward Y. Wong

[57] ABSTRACT

An adhesive for bonding polyethylene terephthalate, polycarbonate and other transparent thermoplastic sheets to form optically clear laminants with improved bond strengths which remain intact over temperature exposures ranging from −40° C. to 70° C. and humidities ranging up to 90% at 40° C. is provided. The adhesive is a combination of approximately 20% molecular weight phenoxy resin and approximately 80% molecular weight polyurethane resin.

9 Claims, 4 Drawing Figures

LAMINATES HAVING OPTICALLY CLEAR LAMINATES HAVING HIGH MOLECULAR WEIGHT PHENOXY-HIGH CRYSTALLINITY POLYURETHANE ADHESIVE

REFERENCES TO RELATED CASES

This is a continuation of application Ser. No. 151,215, filed May 19, 1980, now abandoned which in turn is a divisional of application Ser. No. 061,581, "High Molecular Weight Phenoxy-High Crystallinity Polyurethane Adhesive", filed July 30, 1979, now abandoned.

BACKGROUND AND SUMMARY OF THE INVENTION

It is an object of this invention to provide a composition and method for bonding polyethylene terephthalate, polycarbonate and other transparent thermoplastic sheets to form optically clear laminants with good bond strength. In particular, it is desired that the cosmetic and physical integrity of these bonded laminants remain intact over an exposure of temperatures ranging from $-40°$ C. to $70°$ C. and relative humidity of up to 90% at $40°$ C.

Unimpregnated industrial plastic laminants laminated in sheet form and having window-like appearance have typically been bonded with dry film adhesives. Dry film adhesives provide greater ease in laminant assembly by virtue of their room temperature non-tacky surface and are less prone to air entrapment than their quasi-liquid and liquid resin counterparts. Heat and pressure are required to allow proper wetting of the adhesive to each substrate and, as such, laminating temperature is usually the limiting variable in selecting a dry film adhesive for bonding plastic sheets.

Heat distortion temperatures of the thermoplastic laminants in question are relatively low. For example, polycarbonate film has a distortion temperature of $135°$ at 66 psi laminating pressure. For platen lamination processing, the dry film adhesive of choice should, therefore, obtain its properties in a temperature range of $70°$ C. to $125°$ C. This range is substantially reduced for hot nip roll laminating since the nip roll in contact with the plastic sheet must be substantially higher than the activation temperature of the adhesive; e.g., a $70°$ C. to $90°$ C. range. The lower temperature ($70°$ C.) assumes that no cross-linking between the adhesive and thermoplastic sheet is obtainable at that temperature, and the resultant thermoplastic bond must remain intact at or below $70°$ C. as originally stated.

In our early efforts to find a commercial dry film adhesive meeting the above requirements we discovered surprisingly few candidates. Acrylics, polyvinyl butrol and polyurethane thermoplastic films made up the short list. All other laminating films were either of the wrong chemistry for adhesion such as vinyls and olefins, for example, or required excessive laminating temperatures such as epoxies and phenolics, for example. Of the three, only the polyurethanes provided adequate laminant properties. The acrylic dry films formed laminants with poor adhesion when flexed and polyvinyl butrol showed poor water resistance.

It is known that polyurethane dry films have been used for the manufacture of polycarbonate/acrylic sheet laminated aircraft windshields. Those based on aromatic diisocyanates and polyester-polyols are best suited for maximum adhesion. The use of polyurethane dry films, however, did not produce adequate peel strengths for our laminating applications. In the design of the invention, the chemical functionality of phenoxy resins was very desirable. The combination of pendant hydroxies, phenyl groups and high molecular weight gives tenuous adhesion to a large variety of substrates which is of most importance to our development. Such substrates includes; polycarbonate, polyethylene terephthalate, ABS, epoxy printed circuit boards which include copper clad epoxy impregnated glass fabric board such as those in various grades classified by National Electrical Manufacturers Association (NEMA), e.g., G-10, G-11, FR-2, FR-3, FR-4 and FR-5, and the like. Phenoxies have several disadvantages, however. The primary disadvantage is that phenoxies are extremely brittle and as such, have poor flexibility at room temperature and are subject to cohesive failure when used alone as an adhesive. We found the peel strength of high molecular weight phenoxies to be on the order of 0.25 lb/inch, failing cohesively. A second disadvantage is the relatively high softening point of the high molecular weight phenoxies which is approximately $100°$ C. Finally, for casting purposes, high molecular weight phenoxies require solvents that can adversely effect the properties of the desired substrates. For example, a 25% solids solution of Union Carbide PKHH dissolved in tetrahydrofuran or similar solvent is required to cast phenoxy at a solution viscosity of 400 cps. This solution dissolves polycarbonate substrates. Since the composition of phenoxy and polycarbonate resins are so similar they dissolve in the same solvents, e.g., tetrahydrofuran, mesityl oxide, diacetone alcohol and dioxane. The large amount of solvent, typically 75% by weight, required to dissolve the very high molecular weight phenoxy resin solid to a coating viscosity of approximately 400 cps, when in contact with the polycarbonate substrate also dissolves the polycarbonate. This dissolving occurs very rapidly, making direct coating of phenoxy on polycarbonate impractical.

The solution for these problems is a polyurethane-phenoxy resin blend. The combination of approximately 20% high molecular weight phenoxy and approximately 80% high crystallinity polyurethane show a synergistic result in adhesion, cohesion, application and temperature properties, and additionally allow the use of solvents which do not adversely affect polycarbonate resin substrates.

DESCRIPTION OF THE PREFERRED EMBODIMENT

Figure 1:
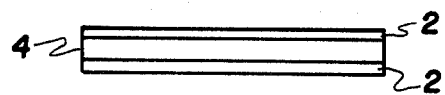
FIG. 1 is a drawing showing a preferred adhesive construction for platen laminating instrument front panels.

The combination of approximately 20% by weight phenoxy resin depicted by the following formula:

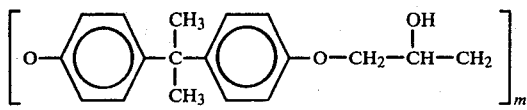

where m is an integer greater than one, and approximately 80% by weight high crystallinity polyurethane resin depicted by the following formula:

where R' is a predominantly linear diol, R is any chemical structure which ties two isocyanate groups together, and m is an integer, forms an adhesive in accordance with the preferred embodiment of the invention. Examples of preferred phenoxy resins include Union Carbide phenoxy resins, PKHH, PKHC and PKHA.

Phenoxy resins are high molecular weight thermoplastic polyhydroxy ethers having a backbone structure similar to high molecular weight epoxy resins. Phenoxies differ from epoxies by their lack of reactive epoxide groups and by molecular weight. Phenoxies have molecular weights of approximately 25,000 whereas epoxies seldom have molecular weights above 4,000. The resin structure of phenoxies also have a strong resemblance to bisphenol A polycarbonates, and hence, their resulting strong adhesion to polycarbonate substrates.

High crystalline urethane resins of the type desired for this application are well known and commercially available, e.g., B. F. Goodrich Estane polymer resin series 5711, 5712, 5713 and 5716. They are typically prepared from the reaction of long chain predominantly linear diols, such as linear polyesters or polyethers (R' in the formula above), with diisocyanates OCNRNCO; R representing well known chemical structures which tie the two isocyanato groups (NCO) together. Said long chain diols typically will have a molecular weight between 1000 and 2000. An example of a linear polyester polyol suitable for this application is a polycaprolactone polyol such as Union Carbide Niax Polyols PCP-0230 and PCP-0240. An example of a linear polyether polyol includes high molecular weight polyethylene glycol such as Union Carbide Carbowax 1000 and 1500.

Said diisocyanates will usually have a molecular weight of about 100 to 700 and include 2,4-tolylene diisocyanate, 2,6-tolylene diisocyanate, hexamethylene-1,6-diisocyanate, diphenylmethane-4,4'-diisocyanate, 4-4'methylene bis (cyclohexyl isocyanate), isophorone diisocyanate and others well known in the art.

Combinations of polyols and polyisocyanates having more than two reactive groups are also possible and well known. These are usually not preferred due to their non-linearity and hence non-crystallinity.

High crystallinity polyurethane as used herein refers to the ability of a resin to crystallize and to provide a resin with fairly binary temperature characteristics. This is desirable for dry film adhesives. Below the crystalline melting point the resin remains solid. The adhesive therefor maintains adhesion after bonding yet prior to bonding the resin surface remains predominantly non-tacky. Above the crystalline melting point the resin becomes quite liquidous allowing for good contact between adhesive and substrate. Crystallinity is desirable but not necessary.

Alternatives to chemical composition may include up to 50% phenoxy resin, although approximately 20% was found to be the better formulation for our application.

This blend is conveniently dissolved in a solvent such as methyl ethyl ketone, for example, and cast by reverse roller coating for example to a desired film thickness and baked to produce a non-tacky clear dry adhesive film with excellent flexibility. The resultant film when placed between substrates with subsequent application of heat and pressure, as described more fully hereinafter, produce exceptional bond strength.

Example: A 1.5 mil thickness cast film adhesive composed of a blend of 80% by weight B. F. Goodrich Estane 5713 polyurethane resin and 20% by weight Union Carbide PKHC phenoxy resin has a softening point at about 70° C. Said film when placed between commercial grades of either DuPont mylar film or General Electric Lexan polycarbonate film of 10 mil thickness and heated to 120° C. for 30 minutes under 30 psi platen pressure and subsequently cooled to room temperature at the same pressure over a period of 10 minutes, develops a bond strength exceeding 30 pounds per inch peel strength measured at either a 90° or 180° peel angle. The peel strength increases from a relatively low value immediately after lamination to a value near or exceeding the shear strength of the plastic films several days thereafter.

Other materials such as ABS, Acrylonitrile-Butadiene-Styrene, and epoxy-glass laminant board have shown near equal peel strengths with the above composition. It is expected that many additional polar and/or aromatic plastic substrates would perform equally well with said adhesive.

We have found the above-described chemical composition to be most readily manufactured and applied when cast from one to three milli-inches thickness on a flexible substrate. Numerous combinations of substrates and adhesive layers have been found to be particularly advantageous in the manufacture of instrument front panels, electronic switches and labels.

Referring to FIG. 1, the preferred adhesive construction for platen laminating instrument front panels is shown. In this application a layer of adhesive 2 is cast by reverse roller coating to a 1.5 mil thickness to each of two sides of a single substrate 4. For front panels, the substrate will normally be transparent and flexible, e.g., polyester or polycarbonate film of approximately 5 mil thickness. This composition allows for easy handling of the adhesive during assembly of the laminants prior to lamination. The non-tack surface of the adhesive provides a means for air escape between the adhesive and mating substrates prior to heat application in order to obtain a "window clear", air free bonded product when required.

Figure 2:
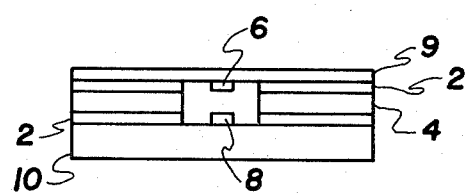
FIG. 2 is a drawing showing a preferred adhesive construction for a membrane switch.

Referring to FIG. 2, the composition is also ideal for use in membrane switch construction. The adhesive composition in this case is used to physically separate two electrical contacts 6 and 8, at least one of which is supported on a flexible membrane 9. The electrical switch is activated by deflecting the flexible membrane through a prepunched hole in the adhesive composition until the two contacts touch. The switch is attached to a base 10 which is, for example, an instrument subpanel.

Figure 3:
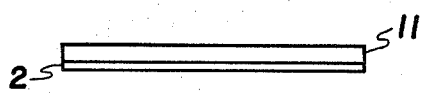
FIG. 3 is a drawing showing a preferred composition for labels and instrument front panels.

A second preferred composition for use in calculator front panels and labels or the like is shown in FIG. 3 wherein the adhesive 2 is cast to a single side of a substrate 11. The opposite substrate side can then be printed per the graphic requirements of the panel or label. Subsequent punching and blanking completes each part which then can be laminated with heat and pressure through the adhesive to a desired instrument surface, e.g., a calculator subpanel.

Figure 4:
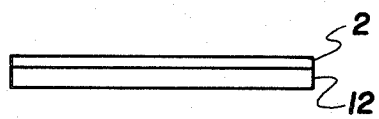
FIG. 4 is a drawing showing adhesive cast on a flexible release linear suitable for later bonding of substrates.

Referring to FIG. 4, adhesive 2 is simply cast on to a flexible release liner 12. The adhesive 2 and liner 12 can be laminated to a first substrate from which the liner can be removed to expose the adhesive for later bonding of the first substrate to a second substrate. This same construction is also ideally suited to hot nip roll laminating where the release liner is removed from the adhesive just prior to reaching the nip roll station.

I claim:

1. A printed label for laminating substrates comprising:
   a substrate having a first surface and a second surface;
   a first printed layer of graphical information printed on the first surface of the substrate; and
   an optically clear adhesive layer applied to the second surface of the substrate, the adhesive comprising a polyurethane resin and up to 50% phenoxy resin by weight, wherein said polyurethane resin is represented by the following formula:

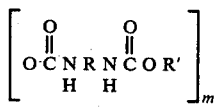

where R' is a long chain predominantly linear diol, R is any chemical structure which ties two isocyanate groups together and m is an integer greater than one, and wherein said phenoxy resin is represented by the following formula:

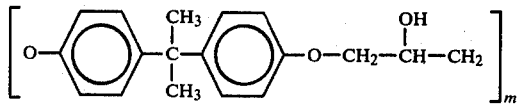

where m is an integer greater than one.

2. A label as in claim 1 wherein the adhesive layer comprises approximately 20% phenoxy resin and 80% polyurethane resin by weight.

3. A label as in claim 1 wherein the substrate comprises polycarbonate.

4. A label as in claim 1 wherein the substrate comprises polyethylene terephthalate.

5. An optically clear adhesive panel for laminating substrates comprising:
   a substrate having a first surface and a second surface; and
   a first layer of optically clear adhesive cast to the first surface and a second layer of optically clear adhesive cast to the second surface, the adhesive comprising a polyurethane resin and up to 50% phenoxy resin by weight, wherein said polyurethane resin is represented by the following formula:

where R' is a long chain predominantly linear diol, R is any chemical structure which ties two isocyanate groups together and m is an integer greater than one, and wherein said phenoxy resin is represented by the following formula:

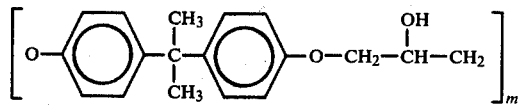

where m is an integer greater than one.

6. The optically clear adhesive as in claim 5 wherein the adhesive comprises approximately 20% phenoxy resin and 80% polyurethane resin by weight.

7. The optically clear adhesive panel as in claim 5 wherein the substrate comprises polycarbonate.

8. The optically clear adhesive panel as in claim 5 wherein the substrate comprises polyethylene terephthalate.

9. An optically clear adhesive panel as in claim 5 for laminating substrates as a membrane switch further comprising:
   a flexible membrane having a first electrical contact on a membrane surface, said membrane surface adhering to said first layer of adhesive; and
   a base having a second electrical contact on a base surface, said base surface adhering to said second layer of adhesive, said substrate being cleared of said electrical contacts and serving to separate said first and second contacts.

* * * * *

UNITED STATES PATENT AND TRADEMARK OFFICE
CERTIFICATE OF CORRECTION

PATENT NO. : 4,387,129
DATED : June 7, 1983
INVENTOR(S) : Kent D. Vincent

It is certified that error appears in the above—identified patent and that said Letters Patent is hereby corrected as shown below:

Title Page, line 1, delete "LAMINATES HAVING". The title should be OPTICALLY CLEAR LAMINATES HAVING HIGH MOLECULAR WEIGHT PHENOXY-HIGH CRYSTALLINITY POLYURETHANE ADHESIVE.

Column 1, line 1, delete "LAMINATES HAVING".

Column 2, line 7, delete "includes;" and insert --includes:--.

Signed and Sealed this

Sixteenth Day of August 1983

[SEAL]

Attest:

GERALD J. MOSSINGHOFF

Attesting Officer    Commissioner of Patents and Trademarks